Patented Feb. 3, 1953

2,627,509

UNITED STATES PATENT OFFICE 2,627,509

VINYL COPOLYMERS AND PROCESS

James A. Arvin, Homewood, Ill., assignor to The Sherwin-Williams Company, Cleveland, Ohio, a corporation of Ohio No Drawing. Application August 26, 1949, Serial No. 112,649

35 Claims. (Cl. 260—22)

This invention is concerned with the formation of copolymers of vinyl compounds and the essentially non-conjugated drying oil fatty acids, either alone, or as combined in the natural state as a glyceride, or as altered by processing into more complex esters of the drying oil fatty acids with polyhydric alcohols to form synthetic oils, or further as combined with polybasic acids and polyhydric alcohols to form what is termed in the art as drying oil modified alkyd resins. More particularly, this invention relates to the copolymerization of said drying oil compositions with styrene in the presence of sulfur dioxide as a catalyst for the reaction, without the necessity of solvents or other reactants or carriers therefor.

The present application is a continuation as to common subject matter of my copending application Serial No. 775,147, filed September 19, 1947.

The present invention is particularly concerned with a method of manufacture of coating compositions containing copolymers of styrene and drying oil acid radical containing components characterized by their transparency, mineral spirits tolerance and enhanced drying qualities.

It is to be particularly emphasized that in the procedure and the products hereinafter described the drying oil fatty acids, either alone or in their combined forms are essentially unbodied, and as to that particular structural part of the composition there is little cross linkage between the fatty acid units. In the case of the fatty acids and the drying olis it can be said that they are essentially monomeric, whereas in the oil modified alkyd type resinous porduct they are, of course, polymeric in nature, but linking is predominately between the polybasic acid-polyhydric alcohol portion of the polymer rather than between adjacent drying oil fatty acid chains. Blown oils are outside the scope of the products and processes here contemplated. Blown oils generally are unsuited for the manufacture of alkyd varnishes because of the rapid discoloration of the product during the cook and are not essential to the resultant copolymerization with styrene obtained by the method herein disclosed. Solvent cooking of the synthetic oils or of the oil modified alkyds is not essential to the benefits of the process, although solvent cooking may be utilized if it is so desired.

The use of vinyl polymers has been indicated as a coating material early as in United States Patent Number 1,241,738, where polymerized vinyl esters were physically mixed with oils such as castor oil to product coatings. It is recognized that useful interpolymers or copolymers of processed non-conjugated and other conjugated drying oils with styrene have heretofore been prepared. So far as is known none of the prior art describes a method or a product wherein the oil modifying portion of the composition is predominantly a seed-oil drying type fatty oil or acid and which is, before conjunction with the vinyl compound, essentially monomeric, unoxidized and non-conjugated.

The use of the physically intermixed vinyl polymers castor oil coatings indicated in United States Patent Number 1,241,738 has been superceded by actual chemical bonding between processed oils and vinyl compounds. Many proposals have been made for chemical combinations of vinyl compounds and fatty oils and in those cases wherein it has been possible to copolymerize fatty olis and vinyl compounds, the formation of new compounds has been attested by changes in the physical properties of the new product proving that mere mixtures were not the result.

Eibner et al., in United States Patent Number 1,934,297 disclose the polymerization of monomeric vinyl esters with an unsaturated oil which had previously been partially polymerized, and in a later patent, United States Patent Number 1,956,551, to the same patentees, the combination of such polymerized materials with cellulose is claimed.

Lawson et al., United States Patent Number 1,975,959, allege that the copolymerization of linseed oil with styrene is feasible in the presence of a mutual solvent therefor. However, only small amounts of linseed oil were indicated to be operable in the method, and a mutual inert solvent was necessary.

Later, Jordan, United States Patent 2,054,019, indicates similar requirements for the copolymerization of drying oils and teaches the formation in the presence of peroxide type catalysts of a copolymer with vinyl compounds and a boiled linseed oil fraction separated by means of butyl alcohol, said fraction being insoluble in butyl alcohol.

Flint and Rothrock, United States Patent Number 2,225,534, copolymerize a conjugated drying oil varnish of extreme oil length in the presence of a mutual solvent, or in cases where a solvent is not used, a large excess of the vinyl monomer is found necessary. They warn, however, of difficulties of premature gelation before the reaction proceeds to a suitable end point. The term "frosting oil" is used, which indicates a conjugated oil such as China-wood oil. Non-conjugated oils are not frosting oils.

Whiting, United States Patent Number 2,374,316, describes a resin compatible with conjugated drying oils made by copolymerizing an oil soluble phenol-aldehyde resin with styrene, and indicates that drying and semi-drying oils may be present, but teaches that such additions prevent long chain polymers.

Flint and Rothrock, United States Patent Number 2,276,176, disclose the formation of a coating agent by copolymerization of vinyl compounds with a varnish derived from a conjugated oil in the presence of a mutual solvent.

Gehart, United States Patent Number 2,320,724 and Sorensen, United States Patent Number 2,343,483, find that interaction between vinyl compounds and drying oils is possible through the chemical addition of maleic anhydride or its derivatives to the oil as a prior step in forming oil-styrene interpolymers.

Mighton, United States Patent Number 2,346,858, discloses a vinyl interpolymer with a conjugated oil, an acid similar to maleic acid and the esters and amides of such acids.

Dunlap, United States Patent Number 2,382,212, employs an oxidized non-conjugated drying oil with vinyl compounds to form copolymers in the presence of catalytic amounts of boron tri-fluoride, sulfuric acid, or toluene sulfonic acid.

In United States Patent Number 2,382,213, Dunlap states, "In order to obtain copolymerization between the non-conjugated drying oil and the vinyl compound some degree of oxidation of the drying oil is necessary . . . in order to obtain a suitable copolymer, the oil should be oxidized until a fairly viscous liquid is developed."

Wakeford and Hewitt, United States Patent Number 2,392,710, propose the blending of a partially polymerized conjugated oil with equal parts or less of a partially polymerized non-conjugated oil prior to copolymerization with styrene.

While it is recognized that useful interpolymers of processed, non-conjugated, and other conjugated drying oils with vinyl compounds may have heretofore been prepared, it has been the experience of those skilled in the art that a predominantly non-conjugated drying oil does not produce a homogeneous reaction product with styrene by any of the above identified methods.

A general object of this invention is to provide a new and useful homogeneous composition through copolymerization of a vinyl compound and polyesters of a mixture of substantially unsaturated fatty acids, the major portion or all of which acids are non-conjugated.

Another object is to provide a method of reacting an aromatic vinyl compound with a fatty radical obtained from a non-conjugated, unsaturated fatty oil to produce new and useful copolymers.

One specific object is to effect copolymerization between styrene and a non-conjugated, unsaturated drying oil fatty acid.

Another specific object is to effect copolymerization between styrene and a polyhydric alcohol ester of a non-conjugated, unsaturated drying oil fatty acid.

Another specific object is to effect copolymerization between styrene and an essentially non-conjugated, unsaturated fatty oil modified alkyd resinous vehicle.

A still further object is to provide a new and improved method for the copolymerization of styrene with linseed oil to form new coating compositions.

An additional object is to provide a new and improved method for the copolymerization of a soya bean oil modified alkyd resin with styrene.

Many other specific objectives are inherent in the disclosure and will become apparent upon reading the balance of the specification in conjunction with the illustrative examples.

As a result of the accomplishment of the foregoing objectives, copolymers have been made in accordance with the invention which are useful as clear coating agents, and as basic raw materials in the formulation of oil modified natural and synthetic resin varnishes, including alkyd and phenolic types. Vehicles made from the disclosed copolymers can be pigmented in various known ways to formulate interior and exterior protective and decorative coatings, and it is apparent that the copolymer oils might also be adapted to various allied fields of usefulness among which are printing inks, linoleum, emulsified oil products and adhesives.

The terms "copolymer" and "interpolymer" are herein employed interchangeably. By use of the term "copolymer" is meant the polymerization product of two or more substances at the same time to yield a complex product having properties different from either material polymerized by itself. While it is intended not to be limited by theory, it is believed that the interpolymerization of the oil and the styrene progresses at a sufficient rate to provide a common or mutual solvent for other polymer molecules which may be preponderantly styrene polymers or preponderantly oil polymers. The terms "copolymer" and "interpolymer" are meant to indicate the complex high molecular weight materials which result from interpolymerization between unlike molecules and homopolymerization between like molecules, reactions leading to these ends occurring simultaneously when two reactive compounds of the nature of those herein proposed are conditioned by proper temperatures, pressures and catalysts to react with each other and together to form clear single phase homogeneous reaction products. The terms should not be understood to infer complete reaction in specific ratios between the individual reactant molecules to form repeated congruent geometric structures.

In the practice of the invention, it has been found that useful copolymers, preferably containing from 5% to 50% of styrene, can be produced from non-conjugated, unsaturated fatty oil acids, fatty oils, or fatty oil acid polyesters, including the drying oil fatty radical of the type obtained from the seeds of soya bean, flax, chia, perilla, safflower and sunflower plants, the fish oils including menhadden and sardine, and other non-conjugated vegetable and animal oils having iodine values between about 120 to 200. Dibasic acids may also be employed to modify the above polyesters and include malonic, succinic, glutaric, adipic, pimelic, suberic, azelaic, sebacic and phthalic, the preferred dibasic acid being phthalic anhydride. Excess acidity upon modification of the polyesters with the above dibasic acids may be corrected by further esterification with polyhydric alcohols including glycol, glycerine, pentaerythritol, dipentearythritol, polypentaerythritol, mannitol, sorbitol and other similar polyhydric alcohols. The useful interpolymers are produced by conjunction of the compounds suggested above with styrene and its homologues in the presence of catalytic amounts of sulfur dioxide gas at temperatures ranging between 325 degrees to 550 degrees F., and preferably between 350 degrees F. and 450 degrees F.

In some instances the percentage of styrene can be increased above 50% of the polymer by increasing the reaction temperature. Increasing the styrene content is comparable to increasing the resin content in a varnish, for as the styrene component is increased, the dried films resulting from the polymer become increasingly hard and brittle. A practical preferred limitation in maximum styrene content has been indicated when the percentage of styrene in the oil-styrene complex is in the neighborhood of 50%. Percentages of styrene lower than 15% (e. g. 5% to 15%) may be achieved by the disclosed process, but such products as result dry slowly and find their widest usage as plasticizers where a fast drying rate is not essential. Hence, the preferred range of styrene in combination with a drying oil has been found to lie between 5% and 50% by weight based on the final copolymer formed. In oil-modified alkyd type condensation products the weight ratio of the fatty acid component to phthalic anhydride, while not critical from an academic view, should not be appreciably less than 10:7. The upper limit is partially dependent upon the amount of styrene to be reacted with the alkyd varnish resin, but is not limited inasmuch as one can make the oil length of the alkyd as long in oil as he might find expedient to achieve qualities in the final product necessary to his requirements.

Preferred alkyd type compositions among those so far found useful have been formed with the ratio of the reactants in the neighborhood of one part oil, 0.5 part phthalic anhydride and one part styrene. It is obvious, however, that considerable variation from this ratio is possible and useful to accomplish various end results.

Partial glyceride oil blends useful in the formation of alkyd resins can be made in situ for the purpose herein with China-wood oil and another polyester derived from soya oil or soya fatty acids, linseed or other drying oil in the ratio of not more than 1:3 parts by weight by heating the oils together with a specified amount of polyhydric alcohol (e. g. glycerine, pentaerythritol) in the presence of a calcium acetate catalyst to a temperature of about 460 degrees F., for an hour more or less. By such a procedure mixed partial esters of the alcohol may be formed as an initial phase or step in the production of alkyd type vehicles. The practice of so doing is well known in the art and is a commonplace industrial operation.

Blending and heating in the presence of the catalyst allows an ester interchange and alcoholysis to occur in the reaction mixture. After the ester interchange and alcoholysis phthalic anhydride is added and further esterification occurs to produce the alkyd resin. After the alkyd resin has been formed it is copolymerized with styrene under the catalytic influence of sulfur dioxide gas bubbled through the hot, newly-formed polyester condensation product.

Alkyd resins may also be formed by simultaneous reaction of fatty acids, glycerine or other polyhydric alcohol and phthalic anhydride prior to copolymerization with styrene.

While styrene is the preferred vinyl compound, mixtures of styrene and alpha methyl styrene have been used successfully. Alpha methyl styrene alone has been found too unreactive for practical use; consequently, it is blended with styrene for the purpose of the invention. While as much as 30% of the total styrene may be alpha methyl styrene, 5% to 10% is the usual amount. The higher the alpha methyl styrene content of the styrene added as a reactant, the less the resulting coating composition will resist the action of aliphatic solvents such as gasoline.

Among the other suitable vinyl compounds are the vinyl esters, halides and cyanides, such as, for instance, vinyl chloride, vinyl acetate, vinyl butyrate and vinyl propionate, the acrylic acid esters, and acrylonitrile. The vinyl compounds employed as starting materials are characterized by a single vinyl

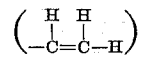

group which may be attached to a carbon atom in an aromatic or an aliphatic group.

It will be observed that the suitable vinyl compounds employed for the purpose of the invention contain a single vinyl group as the sole reactive group and are either aromatic vinyl hydrocarbons, monovinyl esters of saturated fatty acids containing 2 to 4 carbon atoms, monovinyl halides, acrylic acid esters or acrylonitrile.

If styrene is employed, it should be either freshly distilled to remove polymerization inhibitors just before use or certain commercially available styrenes should be selected wherein an inhibitor is added, (e. g. paratertiary butyl catechol) which breaks down at about 180 degrees F., and no longer passivates the styrene within the temperature range of the reaction. When the monomeric styrene obtained contains such inhibitors, the styrene can be used without distillation. Styrene stabilized in this manner is preferred.

The unsaturated fatty acids which form an essential part of the compound or complex of the invention embrace a number of unsaturated oils and acids containing a plurality of acyclic carbon to carbon double bonds. A non-conjugated fatty oil (composed chiefly of glycerides of fatty acids) can be used as the sole oil constituent. Alternatively, the oil or fatty acid can be a composite oil formed from non-conjugated oils and a minor proportion of a conjugated oil (e. g., soya bean oil or soya fatty acid polyesters and a maximum of about 25% to 30% of conjugated fatty radical from China-wood, oiticica, or dehydrated castor oil), the conjugated oil increasing the reactivity of the interester oil to a maximum level of reactivity without premature gelation before interpolymerization occurs. Such a useful oil blend can be made with China-wood oil and another polyester derived from soya oil or soya fatty acids, linseed or other drying oil in the ratio of not more than 1:3 parts by weight by heating the oils together in the presence of a calcium acetate catalyst to a temperature of about 460 degrees F., for an hour.

Pre-blending and pre-heating in the presence of the catalyst allows an ester interchange to occur in the blended polyesters. After the ester interchange, the new polyester is copolymerized with styrene under the catalytic effect of sulfur dioxide gas bubbled through the newly formed interester.

Alcoholysis or ester interchange, or interesterification reactions, can be useful in forming mixed fatty acid polyester oils allowing a wide latitude in oil selection. For example pentaerythritol and soya bean oil in the proper proportion may be heated together in the presence of a catalyst to form the many various glycerides and partial esters of pentaerythritol. China-wood or other oil fatty acids equivalent to the free hydroxyl groups in the mixture can then be added, and through esterification an essentially neutral blend of a mixed fatty acid glycerine ester and a mixed fatty acid pentaerythritol ester copolymerizable with styrene under the conditions herein disclosed will form.

In the following table, the unsaturated fatty acids common in paint and varnish makers' oils are classified according to the type and extent of unsaturation which they possess.

| Fatty Acid | Type | Kind and Degree of Unsaturation |
|---|---|---|
| Oleic | "A" | One double bond. |
| Linoleic | "B" | Two double bonds isolate or non-conjugate in position. |
| Linolenic | "C" | Triple double bonds non-conjugate or isolate in position. |
| Eleostearic Licanic | "D" | Triple double bonds conjugate in position. |

In discussing the fatty acids and oils which may be used alone or combined to form an oil-modified alkyd varnish for use in copolymerization with styrene, it has been found that a straight soya bean oil has about the minimum degree of reactivity necessary to produce clear, homogeneous copolymers according to the method disclosed. Soya bean oil contains approximately 33½% of "A" acids, 52½% of "B" acids and about 2¼% of "C" type acids, the residual acids being saturated types. None of the described acids are of the conjugated class. Linseed oil also suitable by itself as an acid, as an interester oil, or combined in an alkyd varnish, contains about 20% of "A" acids, about 25% of "B" acids and about 45% of "C" acids. From this data one could conceivably assemble the same fatty acids from other sources to form synthetic compounds as indicated having a reactivity equivalent to linseed or soya oil, as from fatty acids recovered through solvent extraction methods or molecular distillations from animal or vegetable sources.

Conjugated drying oils containing above 70% of fatty acids of the "D" classification have been suitably processed to form alkyd vehicles, but generally speaking are of such a high degree of reactivity that difficulties occur in completion of the alkyd varnish without obtaining impractically high viscosities. Gelation often occurs before the acid value of the desired alkyd has been obtained. Upon attempting further additions—such as herein disclosed—premature gelation occurs. Premature gelation is therefore one of the limiting factors as to the percentage of "D" type acids present as the acid, or in an oil, or polyester, or an alkyd, for formation of homogeneous copolymers.

The occurrence of about 10% or less of saturated acids (e. g. palmitic and stearic acids) in oils from oil bearing seeds is well known and the use in part of these or other saturated acids is permissible provided that the proportions are sufficiently limited so as not to impair the reactive character of the drying oil acid or polyester. So long as the percentages of saturated oils do not exceed the proportion carried in naturally from the vegetable drying oils, no difficulty is to be anticipated, and it is to be understood that the remainder of the oils present and not described in the oil analyses herein reported may be, but it is not required that they be, saturated varieties of seed oils.

As the percentage of "C" type fatty acids in the drying oil component of the projected copolymer increase, less "D" type acids should be used to insure against premature gelation due to too high a reactivity level.

Formulation of the mixed polyester allows considerable latitude in both the kind and amount of fatty acid used. Synthetic oils may be produced through use of soya bean oil or soya fatty acids, or commercially available fatty acids such as Armour & Company's Neofat 3-R, which contains about 60% of linoleic acid by forming esters with glycerol or other polyhydric alcohol.

It becomes apparent that between straight refined soya bean oil defining a minimum reactivity mixed fatty acid polyester, or alkyd, and a mixed polyester of principally linseed fatty acids containing a proportion of China-wood oil fatty acids which defines a maximum reactivity mixed fatty acid, polyester or alkyd, there are innumerable combinations of fatty acids of varying degrees and kinds of unsaturation that can be selected to form synthetic drying oils useful in forming new and novel interpolymers or copolymers with styrene and its homologues by the methods herein described and illustrated. Drying and semi-drying oils illustrated by perilla, chia, safflower, sunflower, etc. may be used as the glycerides, or they may be "split" to provide usable unsaturated fatty acids alone, or as a part of the mixed polyesters hereinbefore described.

It is further apparent that the polyhydric alcohol forming a part of the synthetic oil or mixed fatty acid polyester or oil modified alkyd can be selected from a wide variety of polyhydroxy compounds well known in resin formulation, among the most commonly used of which are glycerine, glycol, pentaerythritol, polypentaerythritol, sorbitol, mannitol, polyallyl alcohol and others.

The mixed fatty acid polyesters may be formed either by direct esterification, or indirectly by ester interchange reactions with the natural or synthetic triglyceride oils.

It is also apparent that the selection of the polyhydric alcohol forming a part of the polyester or the alkyd may have some effect upon the reactivity of the resultant product, and that modifications of the proportions will be in order depending upon the alcohol selected, whether an alkyd resin is first formed, and if so, the amount of phthalic anhydride used, and the particular qualities desired in the resultant styrene-oil copolymer.

It is useful in certain applications to first copolymerize the aromatic vinyl compound with the mixed fatty acids prior to esterification with a polyhydric alcohol, or prior to the manufacture of an alkyd resin by means of the sulfur dioxide process. However, it is generally preferable to form the fatty oil complex polyesters prior to the conjunction reaction with styrene.

A preferred method of carrying out the invention consists of heating the fatty acid, the polyester oil, or the drying oil modified alkyd to a temperature within the disclosed range and bleeding sulfur dioxide gas through the hot oil at a slow steady rate with mechanical agitation of the mass, meanwhile adding styrene or a blend of styrene and alpha methyl styrene gradually. Following the addition of the monomer, the reaction mixture may be treated in various ways to complete the reaction and to free the product of unreacted monomers. At any desired stage unreacted monomers may be removed by blowing the reaction mass with an inert gas such as carbon dioxide or nitrogen, or by steam distilling, or by distillation at reduced pressures.

It will be noted that the interpolymerization reaction is accomplished at atmospheric pressure, although other pressures may be employed from sub- to superatmospheric with more or less advantage, at the expense of unnecessary complication. Reaction at atmospheric pressure has been found quite satisfactory.

While the temperature can be varied within a not too critical range, there are indicated limits wherein the operation is most successful, and temperatures selected within that range are best varied according to other variable factors heretofore discussed.

With linseed oil, the interpolymerization cannot be accomplished at less than 325 degrees F. to obtain clear, homogeneous products. At temperatures greater than 450 degrees F., the resulting interpolymers tend to dry somewhat slowly, and 550 degrees F. seems to be the maximum temperature above which drying type copolymers are not formed. Products in the top temperature range are suitable for use in the field of plasticizers. While temperatures of greater than 450 degrees F. can be used in some cases advantageously, a range of from 350 degrees F. to 450 degrees F. is preferred for oils comparable with linseed oil as to the fatty acid components. When the fatty acids or oils so used are comparable with a straight soya bean oil, the preferred minimum temperature limit is about 400 degrees F. As the "D" type acids are increased approaching a maximum, the preferred minimum temperature limit may be lowered to as low as 350 degrees F.

The following products were made in glass equipment in laboratory size batches in which the parts are by weight. Standard ground glass, three-neck glass flasks equipped with condenser, agitator, a separatory funnel for adding the styrene and a perforated glass tube by means of which gases could be directed through the batch, and a thermometer. In forming the alkyd resin the condenser was removed except in those cases where solvent was employed in the cooking. Solvent cooking of the alkyd vehicle is not illustrated but the method is so well known that it has been deemed redundant to illustrate this variant. The equipment noted was used in all except the examples as noted. In all the examples the quantities are given in parts by weight unless otherwise indicated.

EXAMPLE I

Alkali refined linseed oil (2075 parts) was held at 350 degrees F. with agitation while sulfur dioxide gas was bubbled in at a steady rate. Styrene monomer (583 parts) was added gradually in 5½ hours. The temperature was then gradually increased to 460 degrees F. in two hours. Any sulfur dioxide gas was dispelled and unreacted styrene monomer removed by steam distillation. A perfectly clear material of Q Gardner-Holdt viscosity and composed of 14.3% combined styrene and 85.7% oil was obtained.

EXAMPLE II

A procedure similar to Example I described above was followed using 2640 parts of alkali refined linseed oil and 1132 parts of styrene monomer. The styrene monomer addition was made in eleven hours. A clear product was obtained of X-Y Gardner-Holdt viscosity and composed of 28% combined styrene and 72% linseed oil.

EXAMPLE III

Alkali refined linseed oil (1650 parts) was held at 350 degrees F. with agitation while sulfur dioxide gas was steadily bubbled in. Styrene monomer (675 parts) was gradually added in 2½ hours. The sulfur dioxide gas was continued through the batch and another 675 parts of styrene monomer gradually added in 2¼ hours. The mixture was gradually heated to 450 degree F. in one hour. A clear material (45% styrene-55% linseed oil copolymerized) of about two minutes Gardner-Holdt viscosity resulted, i. e., two minutes time was required for a bubble to travel through the copolymer in a standard tube when inverted.

EXAMPLE IV

Alkali refined linseed oil (1250 parts) was held at 350 degrees F. with agitation while sulfur dioxide gas was bubbled in at a steady rate. Styrene monomer (625 parts) was gradually added in seven hours. The sulfur dioxide gas was now replaced with carbon dioxide and an additional 625 parts styrene monomer added in 1¼ hours. The temperature was then increased to 460 degrees F. in one hour. A perfectly clear five minute Gardner-Holdt viscosity material containing 50% combined styrene and 50% oil resulted.

A film of the material with 0.5% lead and 0.05% cobalt added in the form of the commercial naphthenates dried hard and clear in six hours.

EXAMPLE V

Alkali refined linseed oil (1800 parts) was held at 350 degrees F. with agitation while sulfur dioxide gas was bubbled in at a steady rate. Styrene monomer (2000 parts) was added at a uniform rate in 9½ hours. The sulfur dioxide was continued and the temperature raised to 460 degrees F. in one hour. Unreacted styrene was removed by steam distillation. The resulting product was perfectly clear, had a viscosity of 142 minutes Gardner-Holdt, and a composition of 50% combined styrene and 49.5% linseed oil. A film of the material with 0.5% lead and 0.05% cobalt added in the form of the commercial naphthenates dried hard and clear in six hours.

EXAMPLE VI

Alkali refined linseed (2100 parts) was held at 350 degrees F. with agitation while sulfur dioxide gas was bubbled in at a steady rate. Styrene monomer (1555 parts) was added at a uniform rate in 9¾ hours. After holding one hour, the sulfur dioxide was continued through the batch and the temperature raised to 460 degrees F. in one hour. Unreacted styrene was removed by steam distillation. The resulting product was perfectly clear, had a viscosity of six minutes Gardner-Holdt, and had a composition of 40.6% combined styrene and 59.4% linseed oil.

EXAMPLE VII

Linseed oil (1500 parts) was held at 300 degrees F. with agitation while sulfur dioxide gas was passed in at a steady rate. An equal weight of styrene monomer was added at a uniform rate in 8½ hours. After holding one hour at 400 degrees F. the reaction mixture was gradually heated to 460 degrees F. in two hours. Unreacted styrene was removed by distillation under reduced pressure.

A clear material of twenty-two minutes Gardner-Holdt viscosity resulted. A film of the material with 0.5% lead and 0.05% cobalt added in the form of the commercial naphthenates dried hard and clear in twenty-four hours.

EXAMPLE VIII 1700 grams of alkali refined soya bean oil were heated to 425 degrees F., under a blanket of carbon dioxide gas. When the temperature of 425 degrees F. was attained, sulfur dioxide gas was passed through the batch and 1700 grams of essentially monomeric styrene was added over a 10¾ hour period. The batch was then increased in temperature to 460 degrees F., and held for one hour.

The resulting copolymer had a very light color of 2 Gardner-Holdt and was clear and bright. It was reducible with mineral spirits by more than 1500% without cloud or other incompatibility.

A duplicate run over the above formula, but requiring 15½ hours for styrene addition, gave a similar product having a slightly higher viscosity.

EXAMPLE IX

A mixture of refined soya and China-wood oil in the ratio of 9:1 parts by weight was held at 460 degrees F. for one hour with calcium acetate catalyst; then cooled and filtered. Sulfur dioxide gas was bubbled at a steady rate into 1500 parts of this material held at 350 degrees F. with agitation. Styrene monomer (1500 parts) was added at a uniform rate in 13¾ hours. After heating to 460 degrees F. and holding thirty minutes the reaction mixture was freed of unreacted styrene by distillation at reduced pressure. The product was opalescent at room temperature, had a viscosity of 165 minutes Gardner-Holdt, and gave a slightly cloudy dried film.

EXAMPLE X

Example IX was followed except that 375 degrees F. was the reaction temperature. A clear material resulted of 140 minutes Gardner-Holt viscosity. A film of this material with 0.05% cobalt and 0.5% lead added in the form of the commercial naphthenates dried hard and clear in twenty-four hours.

EXAMPLE XI

Example IX was followed except that 400 degrees F. was the reaction temperature. A clear material of 32½ minutes Gardner-Holdt viscosity resulted. A film of this material with 0.05% cobalt and 0.5% lead dried to a clear and tough film in twenty-four hours.

While the temperature may be increased above 400 degrees F., a maximum speed of drying is indicated at about this temperature.

EXAMPLE XII 1500 grams of linseed oil was heated to 550 degrees F. and sulfur dioxide gas was bubbled through the hot oil while 1500 grams of styrene, freshly distilled, was added over a 11½ hour period. An oil resulted having a viscosity of 6½ minutes Gardner-Holdt scale.

This example illustrates the maximum temperature recommended.

EXAMPLE XIII

An essentially neutral ester was prepared from linseed fatty acids and pentaerythritol, 1500 parts of the resultant ester was heated to 425 degrees F., and sulfur dioxide gas was bled into the hot oil while 1500 grams of styrene were added slowly over a fourteen hour period. An extremely viscous oil of ten hours for a bubble to travel the length of a Gardner-Holdt tube resulted having an acid value of 2.8, extremely good solubility in mineral spirits and which set in 2½ hours and was tack free to foil on overnight dry after application in a thin film.

EXAMPLE XIV 1250 grams of alkali refined linseed oil was heated to 350 degrees F., and sulfur dioxide gas was bubbled through the hot oil.

A blend of 1125 grams of styrene and 125 grams of alpha methyl styrene monomer were added to the above mixture slowly over a period of about 9¾ hours. After all the styrene had been added, the temperature was increased to 450 degrees F. and held for one hour. The reaction mixture was freed of unreacted styrene and low molecular weight by-products by steam distillation. The product had a viscosity of 45 minutes on a Gardner-Holdt tube.

This example illustrates the use of a blend of styrene and a homologue in an interpolymer, and steam distillation to remove the unreacted aromatic vinyl component.

EXAMPLE XV 1500 grams of alkali refined linseed oil was heated to 280 degrees F. to 285 degrees F. under a carbon dioxide blanket. At this point, the carbon dioxide was shut down and a light sulfur dioxide blow introduced. The styrene was slowly added at the same time, dropwise over a sixteen to eighteen hour period, while the batch temperature was increased to 425 degrees F., the rate of increase being indicated by the amount of styrene refluxing. After 1500 grams of styrene had been added, the batch was held one hour at 425 degrees F., cooled and vacuum stripped. A 99% yield was obtained with a viscosity of ten minutes in Gardner-Holdt tube at 77 degrees F. The acid value was practically zero and the color 2-3 Gardner-Holdt.

This example illustrates the preparation of an intermediate polyester useful in making an alkyd varnish.

EXAMPLE XVI

Linseed fatty acids (1251 parts) were taken to 350 degrees F., in one hour while under an inert gas ($CO_2$) blanket. Upon gaining 350 degrees F., the $CO_2$ was shut down and $SO_2$ was bubbled steadily through the hot acids. Styrene monomer (700 parts) was added in small increments over a 5½ hour period. The $SO_2$ was shut down and an additional 680 parts of styrene monomer added in small increments over another similar time interval, meanwhile holding an inert gas blanket over the reaction mass. Heat input was increased and the mass blown or sparged with $CO_2$ until a temperature of 450 degrees F. was reached. The latter step serves to remove unreacted monomer. The resultant polymer had a viscosity of 85 seconds in a Gardner-Holdt tube and a color of 12. The acid value was 88. The copolymer was clear at room temperature.

When the same batch was made without the use of $SO_2$ as a polymerization catalyst the resultant fatty acid copolymer was opaque, indicating incompatibility of the products formed.

EXAMPLE XVII

An alkyd varnish was made from the copolymer fatty acids of Example XVI by heating 686 parts of the copolymer and 158 parts of pentaerythritol in a stainless steel varnish kettle equipped with agitator, thermometer and blow ring to 350 degrees F., in one hour. 0.8 part of litharge pasted in a portion of the copolymer acids was added as catalyst for the esterification and 440 degrees F. was gained in thirty minutes. The temperature was held at 440 degrees F. for 1½ hours. Thereupon 240 parts of phthalic anhydride were added and the temperature brought back to 460 degrees F. in 45 minutes. The temperature was held at 460 degrees F. for an acid value of 10 and a cure of about ten seconds which required between three and four hours. The batch was dropped into 980 parts of xylene to form a 50% solids alkyd varnish. Color 10, viscosity Q–R (Gardner Scales) and cure 7 to 10 seconds.

EXAMPLE XVIII

A crude tall oil (1700 parts) containing about 50% unsaturated fatty acids principally oleic, linoleic and linolenic acids, about 40% rosin acids and about 10% of unsaponifiable material was heated to 425 degrees F. in one hour. After gaining this temperature sulfur dioxide was bled through the hot fatty acids and monomeric styrene (1700 parts) was added to the catalyzed acids over a fourteen hour period in small increments. The $SO_2$ was discontinued and $CO_2$ was bled through the hot copolymer meanwhile gaining 460 degrees F., by increased heat input. The temperature was held one hour at 460 degrees F., and after that period 200 to 300 parts of water were collected from a steam distillation of the batch. Following the steam distillation a brisk $CO_2$ blow lasting about five minutes was employed to remove any residual traces of water. The resulting polymer was a heavy dark semi-solid which was found useful in the manufacture of polyesters and alkyd varnishes for dark colored coating compositions.

If a refined grade of tall oil is employed care must be exercised that the viscosity has not been unduly increased in the refining operation.

It has been observed that extremely viscous tall oils will, upon attempted copolymerization as shown, form cloudy reaction products. It is believed that an insufficient number of bonds remain available to achieve sufficient copolymerization between the reactants to form clear products, possibly due to stearic hindrances.

EXAMPLE XIX

*(Long oil—alkyd type)*

INGREDIENTS

| | Parts |
|---|---|
| Fish Oil | 1,290 |
| Glycerin | 347 |
| Phthalic Anhydride | 755 |
| Styrene | 1,290 |
| Calcium Acetate | 3 |
| Sulfur Dioxide as needed. | |
| Xylene | 2,450 |

PROCEDURE

| Hrs. | °F. | Inst. |
|---|---|---|
| 0:00 | | Heat fish oil and glycerin to 400 degrees F. under a $CO_2$ blanket. |
| 1:00 | 400 | Add calcium acetate. Gain. |
| 1:15 | 440 | Hold 1½ hours. |
| 2:45 | 440 | Add phthalic anhydride; regain 440 degrees F. |
| 3:00 | 440 | Hold one hour. |
| 4:00 | 440 | Cool to 430 degrees F. |
| 4:10 | 430 | Change to $SO_2$; bubbling rate approximately 300 cc. per hour. Add styrene in 5½ to 6 hours. |
| 9:50 | 430 | Gain 460 degrees F. |
| 10:00 | 460 | Stop $SO_2$. Blow $CO_2$ and hold for 20 second cure. |
| 11:00 | | Cut. Filter. |

CHARACTERISTICS

| | |
|---|---|
| Base Yield | 3,576 gms. |
| Viscosity | V–W. |
| Color | 7. |
| Acid Value | 9.9. |
| Final Cure | 24 sec. |
| Mineral Spirits Reduction | Slightly over 1000%. |
| Foil Dry time | Less than two hours. |

EXAMPLE XX

Same as Example XIX, except equivalent proportions of alkali refined linseed oil substituted for the fish oil.

The product resulting had the following characteristics after being reduced to 50% non-volatile content with xylene.

| | |
|---|---|
| Viscosity | H (Gardner Tubes). |
| Color | 4–5 (Gardner). |
| Acid value | 7.3. |
| Final cure value | 10 sec. |
| Mineral spirits tolerance | above 2000%. |

EXAMPLE XXI

*(Approaches maximum limit of phthalic anhydride in the alkyd-styrene copolymer.)*

1000 parts alkali refined linseed oil and 322 parts glycerine were heated in a varnish kettle under an inert gas blanket to 400 degrees F., in 45 minutes and 2.5 parts of calcium acetate pasted in a small portion of the oil was added. The temperature was increased to 440 degrees F., in thirty minutes, and held at 440 degrees F. for ninety minutes. 700 parts of phthalic anhydride was added, and sulfur dioxide gas was blown through the batch. 1000 parts of styrene was added over a little more than a four hour interval, allowing the temperature to drop to 350 degrees F. in the last fifteen or twenty minutes of the styrene addition. The batch was held at 350 degrees F., for thirty minutes to a cure of 10 seconds. Cut to 50% solids in xylene. The resulting alkyd resin was fast drying, and had tendencies toward brittleness.

EXAMPLE XXII

*(Illustration of practical styrene maximum.)*

| | Parts |
|---|---|
| Fish oil | 1290 |
| Glycerin | 374 |
| Calcium acetate | 3 |
| Phthalic anhydride | 755 |
| Styrene | 1680 |

The above parts were cooked together as in Example XXI, except that experiments were conducted on a series as above, wherein it was determined that a maximum of one-half the styrene could be added as a first addition and still obtain a clear pill. If more than one-half of the total styrene was added in the above, cloudy products were obtained. This example, illustrating a practical maximum of styrene, also illustrates the maximum styrene which may be added as a first increment of addition. The above batch was reduced to 50% solids with a solvent composed of 25% of V. M. and P. naphtha and 75% xylol and was found to have infinite capacity for reduction with mineral spirits.

EXAMPLE XXIII

*(Illustrative of maximum conjugated oil in an alkyd-styrene copolymer.)*

903 parts alkali refined linseed oil and 387 parts of China-wood oil were blended in a varnish kettle and 347 parts of glycerine added. The temperature was increased to 400 degrees F., holding the batch under a carbon dioxide blanket upon reaching 400 degrees F., calcium acetate (3 parts) was added as an alcoholysis catalyst and the temperature increased to 440 degrees F. in about a half hour. Temperature held at 440 degrees F. for an hour and a half, and then add 755 parts of phthalic anhydride and start bleeding $SO_2$ through the reaction mixture along with a small stream of styrene. The temperature was reduced at this point to 350 degrees F., and held at 350 degrees F. during the addition of 1290 parts of styrene which was accomplished in five hours. After all the styrene had been added the temperature was increased to 400 degrees F., and held for an eleven second sure. The batch was thinned to 50% solids with a solvent blend containing 25% mineral spirits and 75% xylene. The product could be thinned 100% with mineral spirits, and dried to a foil free state in three hours.

EXAMPLE XXIV

An alkyd varnish was made from the oil prepared in Example XV in the following manner:

In a stainless steel agitator type varnish kettle equipped with a blow ring, 3450 grams of the oil of Example XV was heated to 350 degrees F. while blowing vigorously with carbon dioxide. 548 grams of glycerine was added and the carbon dioxide volume reduced and maintained only as a blanket. The temperature of the batch was increased to 400 degrees F. and a slurry containing 3½ grams of litharge in a small amount of the oil was added. The temperature was further increased to 460 degrees F., and held one hour. 1238 grams of phthalic anhydride was added and the temperature increased to 500 degrees F., the carbon dioxide was increased gradually as a blow over about a three hour period holding the batch for a cure point of from seven to ten seconds (a high degree of polymerization). The batch was cooled and dropped into 4975 grams of xylol. The viscosity of the product was J–K Gardner-Holdt, and the acid value 5 to 10.

While it has been found that results are more consistent by bubbling sulfur dioxide gas into the reactants throughout the reaction period, it will be noted that it has been possible in some cases to use the sulfur dioxide blow only at the start of the reaction, and that after a preliminary sulfur dioxide blow, carbon dioxide can be admitted in place of the sulfur dioxide gas for the remainder of the reaction period.

The following Examples A, B, C and D illustrate some of the results obtained with reaction components and conditions outside the scope of the invention:

EXAMPLE A (Styrene and alkali refined linseed oil at 80% concentration in a solvent.)

A mixture of 1200 parts alkali refined linseed oil, 1200 parts monomeric styrene, and 324 parts xylene was held at 300 degrees F. with agitation while a solution of 24 parts benzoyl peroxide in 276 parts xylene was added gradually in 16½ hours. A clear solution resulted, but a film of the material on evaporation of solvent became opaque and separated into phases.

This example illustrated that under certain conditions a non-conjugated linseed oil did not interpolymerize with styrene.

EXAMPLE B (Styrene and 150 poise heat bodied linseed oil in a solvent.)

A mixture of 1050 parts monomeric styrene, 1050 parts 150 poise heat bodied linseed oil, and 1159 parts xylene was held at 300 degrees F. while a solution of 21 parts benzoyl peroxide in 241 parts xylene was added in ten hours. Both solution and dried film were very cloudy.

This example illustrated a method which yielded a cloudy film and solution when the styrene content was as high as 50% of the bodied oil used.

EXAMPLE C (Styrene and alkali refined linseed without solvent or catalyst.)

A mixture of 1500 parts monomeric styrene and 1500 parts alkali refined linseed was heated so that reflux was maintained. In 8½ hours the temperature gradually increased until no more styrene monomer refluxed at 450 degrees F. The reaction product was then held six hours at 550 degrees F. The product was very opaque at room temperature and separated into phases on long standing.

This example illustrated a proposed method found unworkable under the conditions shown.

EXAMPLE D

Linseed oil (1500 parts) was held at 300 degrees F. with agitation, while sulfur dioxide gas was passed into it at a steady rate. An equal weight of styrene monomer was added at a uniform rate in 8½ hours. After holding the reaction mixture at 300 degrees F. for one hour, it was gradually heated to 460 degrees F. in two hours. Unreacted styrene was removed by distillation under reduced pressure. The product was opaque at room temperature and slowly separated into phases on standing.

This example illustrates that 300 degrees F. is below the point where complete interpolymerization occurs when the ratio of linseed oil to styrene is about 1:1.

A study of the above specification will bring to the mind of one skilled in the art other variations in composition and procedure, and it is understood that the description and examples, while extensive, are in no wise limiting upon the compositions inherent in the disclosure. Modifications which conform to the spirit of the invention are intended to be included within the scope of the following claims.

It will be observed that the starting materials employed in accordance with this invention for copolymerization with styrene, or a homologue thereof, may be described as "substantially monomeric" when referring to the drying oils or the fatty acids, in that they are not oxidized or polymerized to a viscous state as in the case of bodied oils or oxidized oils.

In the case of the oil modified alkyd vehicle there is some copolymerization which is believed to be through the polybasic acid-polyhydric alcohol linkages primarily, and very little polymerization between the actual fatty oil radicals of the resultant vehicle. It is believed that there is little actual reaction between the fatty oil molecules during the esterification stage in alkyd manufacture as the temperature is too low. Usually oils are bodied at temperatures between 560 degrees F. to 625 degrees F., which is above the usual range of temperature in alkyd formation. As the styrene is in contact with the fatty oil during esterification, and the reactants are activated by the sulfur dioxide, copolymerization of the styrene and fatty oil radical is contemporaneous with the esterification reaction in the formation of the alkyd.

In the fatty acid portion of the fatty acid, oil, oil modified alkyd varnish, or synthetic oil ester the major proportion of the acids are unsaturated and contain non-conjugated aliphatic acyclic carbon to carbon double bonds. The major portion of the said acids present in a given composition are characterized by a degree of unsaturation greater than that of oleic acid, but may contain minor proportions of conjugated fatty acids. It is believed that the invention provides for the first time a method of preparing a fluid, homogeneous copolymer of an aromatic vinyl compound and (1) a non-conjugated, substantially monomeric fatty oil acid, or (2) the natural and synthetic oils available through esterification of the said acids with polyhydric alcohols, or (3) oil modified alkyd resinous vehicles wherein the oil modified portion is such a substantially monomeric, unoxidized fatty acid or oil as is available from non-conjugated drying or semi-drying oils, e. g., linseed oil, raw or refined alkali, or a raw or alkali refined soya bean oil.

The term "varnish" as used herein is in accordance with the definition stated in Mattiello, volume 3 of "Protective and Decorative Coatings," page 194, which reading is as follows, "A liquid coating material containing no pigment which flows out to a smooth coat when applied and dries to a smooth, glossy, relatively hard, permanent solid when exposed in a thin film to air." On page 195 of the same article an "oleoresinous varnish" is defined to include:

(1) Oil plus
    (a) Natural resin
    (b) Synthetic resin
(2) Oil
(3) Oil modified glycero phthalate The invention is hereby claimed as follows:

1. The process of producing a fluid homogeneous copolymer which comprises copolymerizing a quantity of a monomeric vinyl compound containing a single vinyl group as the sole reactive group, said vinyl compound being from the group consisting of aromatic vinyl hydrocarbons containing a single vinyl group as the sole reactive group, monovinyl esters of saturated fatty acids containing 2 to 4 carbon atoms, monovinyl halides, acrylic acid esters and acrylonitrile, and a quantity of a substance from the group consisting of non-bodied, non-conjugated, unsaturated fatty oil acids and polyhydric alcohol esters thereof, at temperatures within the range of from 325° F. to 550° F. in the presence of sulfur dioxide, the quantity of said monomeric vinyl compound being 5% to 50% by weight of the resultant copolymer.

2. The process for producing a fluid homogeneous copolymer which consists essentially of the steps of heating an oleoresinous varnish containing chemically combined non-bodied, non-conjugated fatty oil acid radicals to a temperature within the range from 325 degrees F. to 550 degrees F., agitating said oleoresinous varnish and slowly adding to said varnish over a period of time from 10% to 100% by weight of styrene, based on the weight of the polyester, and bubbling sulfur dioxide gas through the reaction mixture.

3. The process for producing a fluid homogeneous copolymer from the interesterification product of more than one unsaturated fatty acid whose major acidic components are non-conjugated, unsaturated fatty acids and other fatty acids in minor proportion whose acidic components are obtained from conjugated oils with an equivalent amount of a polyhydric alcohol which comprises admitting to the polyester-forming reaction mass while at a temperature within the range of from 350° F. to 450° F. successive small portions of styrene while simultaneously passing sulfur dioxide through the mass until from 10% to 100% by weight of styrene based upon the weight of the forming polyester has been added and reacted.

4. The process for producing a fluid homogeneous copolymer from a polyester oil containing not more than 30% of an unsaturated, conjugated fatty acid and not less than 70% of an unsaturated, non-conjugated, non-bodied, unoxidized fatty acid of the acid radicals present therein which comprises admitting to the mixed polyester product held at a temperature of between 350° F. and 450° F. successive small portions of styrene while simultaneously passing sulfur dioxide through the mass until from 10% to 100% by weight of styrene, based on the weight of said polyester product has been added and reacted.

5. The process for producing a copolymer which consists essentially of heating an oleoresinous varnish containing non-bodied, unoxidized linseed fatty acid radicals to a temperature within the range from 325 degrees F. to 550 degrees F., and while agitating the oil directing a stream of sulfur dioxide gas therethrough, simultaneously adding styrene slowly over a period of time until a weight of styrene not appreciably more than equivalent to the weight of said varnish has been incorporated to form a homogeneous copolymer.

6. The process for producing a copolymer which consists essentially of heating an oleoresinous varnish containing non-bodied unoxidized soya bean oil fatty acid radicals to a temperature within the range from 325 degrees F. to 550 degrees F., directing a stream of sulfur dioxide gas therethrough, simultaneously adding styrene slowly over a period of time until a weight of styrene not more than equivalent to the weight of said varnish has been incorporated to form a solvent-soluble homogeneous copolymer 7. A process of producing a fluid homogeneous copolymer which consists essentially of copolymerizing a monomeric aromatic vinyl hydrocarbon containing a single vinyl group as the sole reactive group with a mixed polyester of a polyhydric alcohol, an organic polycarboxylic acid and a plurality of drying oil fatty acids, less than 30% of said fatty acids containing conjugated double bonds and a major proportion of the remaining fatty acids containing at least two non-conjugated acyclic carbon to carbon double bonds, and effecting said polymerization at a temperature within the range of 325° F. to 550° F. in the presence of sulfur dioxide, the quantity of the said monomeric vinyl compound being 5% to 50% by weight of the copolymer.

8. The process of producing a fluid homogeneous copolymer which consists essentially of polymerizing styrene with an oleoresinous varnish containing a plurality of chemically combined non-bodied unoxidized drying oil fatty acid radicals, less than 30% of said fatty acid radicals containing conjugated double bonds and a major proportion of the remaining fatty acid radicals containing at least two non-conjugated acyclic carbon to carbon double bonds, and effecting said polymerization at a temperature within the preferred range of from 350 degrees F. to 450 degrees F., in the presence of sulfur dioxide, the weight of styrene combined being 5% to 50% by weight of the homogeneous copolymer formed.

9. A copolymer of fluid homogeneous character of a monomeric vinyl compound containing a single vinyl group as the sole reactive group, said vinyl compound being from the group consisting of aromatic vinyl hydrocarbons containing a single vinyl group as the sole reactive group, monovinyl esters of saturated fatty acids containing 2 to 4 carbon atoms, monovinyl halides, acrylic acid esters and acrylonitrile, and a substance from the group consisting of non-bodied, non-conjugated, unsaturated fatty oil acids and polyhydric alcohol esters thereof, copolymerized at temperatures within the range of from 325° F. to 550° F. in the presence of sulfur dioxide, the proportion of said monomeric vinyl compound being 5% to 50% by weight of said copolymer.

10. A copolymer of fluid homogeneous character of styrene and a substance having a non-bodied, non-conjugated, unsaturated fatty oil acid group therein, copolymerized at temperatures in the range of 325 degrees F. to 550 degrees F. in the presence of sulfur dioxide as a catalyst, the proportion of styrene being 5% to 50% by weight of said copolymer.

11. A copolymer of fluid homogeneous character which is the sulfur dioxide catalyzed reaction product of an oleoresinous varnish having fatty oil acid constituents and 10% to 100% by weight of an aromatic vinyl hydrocarbon containing a single vinyl group as the sole reactive group, calculated on the weight of said varnish, interpolymerized at 325 degrees F. to 550 degrees F., more than 50% of the fatty acid constituents of which comprises unsaturated, non-polymerized, non-oxidized, non-conjugated oil seed fatty acids having an unsaturation greater than that of oleic acid.

12. A coplymer of fluid homogeneous character of styrene copolymerized at 325 degrees F. to 550 degrees F. in the presence of sulfur dioxide with an unpolymerized, non-oxidized, unsaturated mixed drying oil composition from the group consisting of unsaturated drying oil fatty acids, polyhydric alcohol esters of drying oil fatty acids, and polyhydric alcohol-polybasic acid esters of drying oil fatty acids, said acid constituents thereof consisting essentially of less than 30% of conjugated fatty acids and less than 90% but more than 40% of non-bodied, non-oxidized fatty oil acids, and the remaining acid constituents consisting essentially of minor amounts of other vegetable seed oil fatty acids.

13. A copolymer of fluid homogeneous character which consists essentially of the interpolymerization product of styrene with a non-oxidized non-bodied drying oil fatty acid containing polyester varnish in the presence of sulfur dioxide at a temperature within the range of from 350 degrees F. to 450 degrees F., said copolymer containing from 5% to 50% by weight of styrene.

14. A copolymer of fluid homogeneous character which consists essentially of the interpolymerization product of styrene with an oleoresinous varnish in which one of the fatty oil acids is linoleic and comprises more than 22% of the fatty acid component and another fatty acid is linolenic acid and is less than 45% of the fatty acid component, and the remainder of the fatty acid component may be varied from up to 35% oleic acid to up to 30% of conjugated, essentially monomeric, unoxidized triene fatty acids, said copolymer containing from 5% to 50% by weight of styrene and interpolymerization between said reactants being catalyzed by the presence of sulfur dioxide at temperatures from 325 degrees F. to 550 degrees F.

15. An oil modified alkyd resinous interpolymer, the oil modifying portion of which is modified by the interpolymerization of styrene with the unsaturated non-bodied, unoxidized, non-conjugated fatty acid groups thereof, said copolymer containing 5% to 50% by weight of styrene, copolymerization of the styrene and the said fatty acid groups being attained by the catalytic effect of sulfur dioxide gas upon the reactants at an elevated temperature within the range of 325 degrees F. to 550 degrees F.

16. A coating composition containing a pigment and a copolymer as claimed in claim 9.

17. A coating composition containing as a predominant portion of the vehicle thereof the composition of matter claimed in claim 13.

18. A coating composition containing a pigment and a copolymer as claimed in claim 14.

19. A coating composition containing a pigment and a copolymer as claimed in claim 15.

20. A process for producing a copolymer which comprises heating a non-bodied, unoxidized interester of soya bean oil and linseed oil to a temperature within the range of from about 325° F. to about 550° F., and adding thereto in small increments over a period of time from 10% to 100% of styrene by weight based on the interester oil, and bubbling sulfur dioxide gas through said heated interester at least initially to catalyze the copolymerization of said polyester and the styrene.

21. The process of producing a fluid homogeneous copolymer which comprises copolymerizing a quantity of a monomeric aromatic vinyl hydrocarbon containing a single vinyl group as the sole reactive group and a quantity of a substance from the group consisting of non-bodied, non-conjugated, unsaturated fatty oil acids and polyhydric alcohol esters thereof, at temperatures within the range of from 325° F. to 550° F. in the presence of sulfur dioxide, the quantity of said monomeric aromatic vinyl compound being 5% to 50% by weight of the resultant copolymer.

22. A copolymer of fluid homogeneous character of a monomeric aromatic vinyl hydrocarbon containing a single vinyl group as the sole reactive group and a substance from the group consisting of non-bodied, non-conjugated, unsaturated fatty oil acids and polyhydric alcohol esters thereof, copolymerized at temperatures within the range of from 325° F. to 550° F. in the presence of sulfur dioxide, the proportion of said monomeric aromatic vinyl compound being 5% to 50% by weight of said copolymer.

23. The process for producing a fluid homogeneous copolymer which comprises the steps of heating a synthetic polyester formed from a non-bodied, non-conjugated fatty oil acid and a polyhydroxy alcohol to a temperature within the range from about 325° F. to about 550° F., agitating the oil and slowly adding to the synthetic oil over a period of time from 10% to 100% by weight of styrene, based on the weight of the polyester, and bubbling sulfur dioxide gas through the reaction mixture.

24. The process for producing a copolymer which comprises heating an essentially non-bodied, unoxidized linseed oil fatty acid polyester to a temperature within the range from about 325° F. to 550° F., and while agitating the oil directing a stream of sulfur dioxide gas therethrough, simultaneously adding styrene slowly over a period of time until an amount of styrene not more than equivalent to the said polyester has been incorporated by interpolymerization, and thereafter removing any excess unreacted styrene by distillation from the copolymer formed.

25. The process of producing a fluid homogeneous copolymer which comprises polymerizing styrene with a mixed polyester of a polyhydric alcohol and a plurality of essentially non-bodied, unoxidized drying oil fatty acids, less than 30% of said fatty acids containing conjugated double bonds and a major proportion of the remaining fatty acids containing at least two non-conjugated carbon to carbon double bonds, effecting said polymerization at a temperature within the range of about 325° F. to about 550° F. in the presence of sulfur dioxide catalyst, the proportion of styrene being 5% to 50% by weight of the copolymer.

26. A coplymer of fluid homogeneous character which is the sulfur dioxide catalyzed reaction product of a mixed unsaturated oil fatty acid polyester and 10% to 100% by weight of an aromatic vinyl hydrocarbon containing a single vinyl group as the sole reactive group, calculated on the weight of said polyester, interpolymerized at 325° F. to 550° F., the major portion of the fatty acid components of which comprises a non-polymerized, non-oxidized, non-conjugated blend of unsaturated fatty acids derived from seed oil fatty acids with a major portion of the said acids being characterized by unsaturation greater than that of oleic acid.

27. A copolymer of fluid homogeneous character which comprises the product of the interpolymerization of styrene at elevated temperature above 325 degrees F. in the presence of sulfur dioxide with an unpolymerized and non-oxidized unsaturated mixed drying oil fatty acid polyester whose acid components consist of less than 30% of a conjugated China-wood oil fatty acid and less than 90% and more than 40% of non-bodied, non-oxidized linoleic acid, and the remaining acid components consisting of minor amounts of other long chain drying oil seed fatty acids.

28. A copolymer of fluid homogeneous character which comprises the interpolymerization of styrene at elevated temperature above 325 degrees F. in the presence of sulfur dioxide with a non-bodied, non-oxidized mixed fatty acid polyester whose essential acid components consist of less than 30% of licanic acid and less than 90% and more than 40% of linoleic acid, and the remaining acid components consisting of minor amounts of other long chain drying oil seed fatty acids.

29. A copolymer of fluid homogeneous character which comprises the interpolymerization product of styrene with an essentially non-bodied, unoxidized soya bean oil polyester in the presence of sulfur dioxide at a temperature within the range of from 325° F. to 550° F., said copolymer containing from 5% to 50% by weight of styrene.

30. A complex synthetic drying oil of fluid homogeneous character which comprises the interpolymerization of styrene with a mixed unsaturated oil fatty acid polyester whose composition for minimum reactivity can be defined by a polyester of refined soya bean oil acids and whose composition for maximum reactivity can be defined by an interester of 70% of linseed oil and 30% China-wood oil, and whose unsaturated fatty acid composition corresponds to the proportion of various fatty acids found in any intermediate interester of the above polyester oils, said complex synthetic drying oil containing from 5% to 50% by weight of styrene, the chemical union of the styrene with the polyester oil catalyzed by the presence of sulfur dioxide at a temperature of between 325 degrees F. and 550 degrees F.

31. A copolymer of fluid homogeneous character which comprises the interpolymerization product of styrene with mixed unsaturated fatty oil acid polyesters in which one of the fatty oil acids is linoleic and comprises more than 22% of the fatty acid component and another fatty acid is linolenic acid and is less than 45% of the fatty acid component, and the remainder of the fatty acid component may be varied from up to 35% oleic acid to up to 30% of conjugated, non-bodied unoxidized triene fatty acids of the class of eleostearic and licanic fatty acids, said copolymer containing from 5% to 50% by weight of styrene and interpolymerization between said reactants being catalyzed by the presence of sulfur dioxide at temperatures from 325° F. to 550° F.

32. An oil modified alkyd resinous interpolymer, the oil modifying portion of which is per se a copolymer of fluid homogeneous character derived through the interpolymerization of styrene with a mixed unsaturated drying oil fatty acid polyester, said copolymer containing 5% to 50% by weight of styrene, polymerization of the styrene and the said fatty acid polyester being attained by the catalytic effect of sulfur dioxide gas upon the reactants at an elevated temperature within the range of 325° F. to 550° F.

33. The process for producing a fluid homogeneous copolymer from the interesterification product of more than one unsaturated drying oil fatty acid containing a minor amount of an unsaturated conjugated fatty acid, a major amount of a non-conjugated, non-bodied, unoxidized fatty acid and an equivalent amount of a polyhydric alcohol which comprises admitting to the polyester-forming reaction mass while at a temperature within the range of from 350 degrees F. to 450 degrees F., successive small portions of styrene while simultaneously passing sulfur dioxide through the mass until from 10% to 100% by weight of styrene, based upon the weight of the forming polyester has been added and reacted.

34. The process for producing a fluid homogeneous copolymer from a polyester oil containing not more than 30% of an unsaturated, conjugated fatty acid and not less than 70% of an unsaturated, non-conjugated, non-bodied, unoxidized fatty acid of the acid radicals present therein which comprises admitting to the mixed polyester product held at a temperature of between 350 degrees F. and 450 degrees F. successive small portions of styrene while simultaneously passing sulfur dioxide through the mass until from 10% to 100% by weight of styrene, based on the weight of said polyester product has been added and reacted.

35. A process for producing a copolymer which comprises heating a non-bodied, unoxidized interester of soya bean oil and linseed oil to a temperature within the range of from about 325 degrees F. to about 550 degrees F., and adding thereto in small increments over a period of time from 10% to 100% of styrene by weight based on the interester oil, and bubbling sulfur dioxide gas through said heated interester at least initially to catalyze the copolymerization of said polyester and the styrene.

JAMES A. ARVIN.

(References on following page)

REFERENCES CITED

The following references are of record in the file of this patent:

UNITED STATES PATENTS

| Number | Name | Date |
|---|---|---|
| 2,137,393 | Dorough et al. | Nov. 22, 1938 |
| 2,382,213 | Dunlap | Aug. 14, 1945 |
| 2,383,055 | Fryling | Aug. 24, 1945 |
| 2,392,710 | Wakeford | Jan. 8, 1946 |
| 2,509,495 | Hammond | May 30, 1950 |

FOREIGN PATENTS

| Number | Country | Date |
|---|---|---|
| 573,835 | Great Britain | Dec. 7, 1945 |
| 747,583 | France | June 20, 1933 |